United States Patent Office 3,494,901
Patented Feb. 10, 1970

3,494,901
POLYMERIZABLE MONOMERS CONTAINING A N-ALKOXYMETHYLURETHANE GROUP AND POLYMERS OBTAINED THEREFROM
Günter Oertel, Cologne-Flittard, and Egon Kuntz, Hans Holtschmidt, and Erwin Müller, Leverkusen, Germany, assignors to Farbenfabriken Bayer Aktiengesellschaft, Leverkusen, Germany, a corporation of Germany
No Drawing. Filed Dec. 1, 1965, Ser. No. 510,933
Claims priority, application Germany, Dec. 30, 1964, F 44,845, Patent 1,251,956
Int. Cl. B01f 9/00
U.S. Cl. 260—82.1              3 Claims

ABSTRACT OF THE DISCLOSURE

Polymerizable, unsaturated monomers containing a N-alkoxymethylurethane or N-alkoxymethylurea group and homopolymers or copolymers of said monomers capable of being cross-linked and useful as synthetic resins.

---

This invention relates to a process for the preparation of high molecular weight products containing urethane- or ureamethylolalkyl ethers.

It is already known that polymers which can easily be modified by a thermal or chemical treatment because they contain quite specific functional groups can be obtained by radically or ionically initiated polymerisation or copolymerisation of olefinically unsaturated polymerisable monomers.

Thus the preparation of polymers containing carboxylic acid amide groups by copolymerisation of vinyl- or vinylidene compounds with compounds such as acrylic acid amide or methacrylic acid amide has already been described. These polymers can be modified, i.e., converted into polymers having technologically particularly valuable properties, by reaction with aldehydes such as formaldehyde, compounds giving off formaldehyde or formaldehyde precondensates.

It is further known to convert vinyl compounds such as acrylic acid amide into the methylol compound by reaction with formaldehyde and then to convert these methylol compounds by copolymerisation with other vinyl- or vinylidene compounds into polymers which can be modified by an after-treatment without the addition of aldehydes such as formaldehyde.

However, these known processes have technical disadvantages in that the methylol compounds undergo further reactions in an alkaline or acid medium and the products of such reactions or mixtures thereof are no longer suitable for the preparation of linear copolymers.

In addition, polymers which contain free hydroxymethyl carboxylic acid amide groups are not stable on storage, i.e., even without the addition of acids or the action of elevated temperatures they undergo a cross-linking process which in many cases converts the polymers into insoluble or unmeltable products which can no longer be shaped.

To overcome these disadvantages, processes have been developed in which high molecular weight products are obtained by polymerisation of compounds such as the methylolmethylethers of acrylic acid amide or the methylolmethylethers of methacrylic acid amide with other olefinically unsaturated polymerisable monomers. The monomers contain a methylolmethylether group instead of the above mentioned methylol groups. Compared with the use of monomers containing free methylol groups, the use of monomers containing etherified methylol groups for the preparation of cross-linkable copolymers constitutes an important advance. The polymers, however, often have the disadvantage that the conversion of the polymer must be carried out at relatively high temperatures or by the prolonged action of elevated temperatures. In addition, the use of the monomeric methylol ethers of acrylic acid amide or of methacrylic acid amide is limited in that as derivatives of acrylic acid amide or of methacrylic acid amide they have fixed polymerisation activities which, for example, determine the incorporation into a macromolecule in the process of copolymerisation with other monomers. A further disadvantage of the aforesaid methylolethers of methylolcarboxylic acid amides of olefinically unsaturated polymerisable carboxylic acids is the disadvantageous effect which a carboxylic acid amide group has on some polymer properties. Thus it is known, for example, that copolymers of acrylonitrile and acrylic acid amides containing more than 85% by weight of bound acrylonitrile have a lower resistance to yellowing at elevated temperatures than the corresponding copolymers of acrylonitrile and acrylic acid esters.

It is thus surprising to find that polymers and copolymers which can readily be cross-linked and which do not have the above mentioned disadvantages of the methylolethers of carboxylic acid amides are obtained if the unsaturated polymerisable monomers used for the preparation of polymers and copolymers contain the N-alkoxymethylurethane- or N-alkoxymethylurea groups in the molecule.

The monomers to be used according to the invention constitute new compounds. In order to prepare them, compounds which contain an olefinically unsaturated polymerisable double bond and phenolic or alcoholic hydroxy- or primary or secondary amino groups can be reacted with alkoxymethylisocyanates. According to another method, the monomers to be used according to the invention may also be obtained by reacting alkoxymethylisocyanates and suitable amino- or hydroxy compounds in known manner to form compounds which still contain at least one phenolic or alcoholic hydroxyl group or a primary or secondary amino group. A polymerisable radical is introduced into these compounds by known methods, preferably by acylation or alkylation.

The above mentioned methods of synthesis for the preparation of the monomers to be used according to the invention are explained below with reference to a specific example:

(a) Method 1:

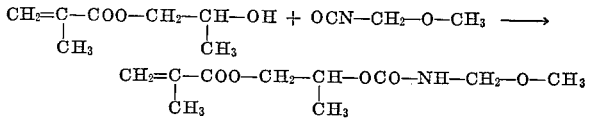

(b) Method 2:

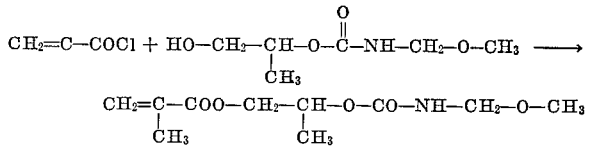

For the preparation of the polymers and copolymers it is preferred to use monomers of the following general formula:

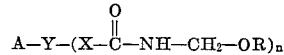

in which

A denotes a vinyl- or vinylidene radical which is linked to radical Y either directly or through an ether-, carboxylic acid ester- or carboxylic acid amide group, Y denotes an alkylene-, aralkylene-, arylene- or cycloalkylene radical which may contain, as bridge members and/or substituents, carboxylic acid amide, carboxylic acid ester, ether, tertiary amino, urea, urethane or sulphonamide groups, halogen atoms, or cyclic radicals containing oxygen, sulphur or nitrogen atoms;

X = O, S, or NR' wherein R' = H or R,

R = an alkyl or alkenyl radical with 1–18 C-atoms, which may be branched.

Monomers which contain as the polymerisable radical (A) a maleic- or fumaric acid ester grouping or a maleic- or fumaric acid amide grouping are also suitable for the process according to the invention. There may also be mentioned compounds which contain several polymerisable double bonds in the radical A such as derivatives of butadiene or isoprene.

n = an integer from 1 to 3.

The monomers listed below are given as examples of such monomers:

CH₂=CH—COO—CH₂—CH₂—O—CO—NH—CH₂—O—CH₃
CH₂=CH—COO—CH₂—CH—O—CO—NH—CH₂—O—C₂H₅
                    |
                    CH₃

CH₂=C—COO—CH₂—CH—O—CO—NH—CH₂—O—C₆H₁₃
     |              |
     Cl             CH₃

CH₂=C—COO—CH—CH—O—CO—NH—CH₂—O—CH₂—CH=CH₂
     |      |   |
     (phenyl) CH₃ CH₃

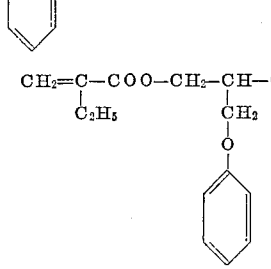

CH₂=C—COO—CH₂—CH—O—CO—NH—CH₂—O—CH₃
     |         |
     CH₃       CH₂Cl

CH₂=C—COO—⟨C₆H₄⟩—O—CO—NH—CH₂—O—CH₃
     |
     CH₃

CH₂=C—COO—CH₂—CH—O—CO—NH—CH₂—O—C₂H₅
     |         |
     C₂H₅      (phenyl)

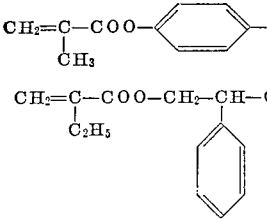

CH₂=CH—COO—(CH₂)₄—O—CO—NH—CH₂—O—CH₃

CH₂=CH—COO—CH₂CH₂—O—CH₂CH₂—O—CO—NH—CH₂—O—CH₃

CH₂=C—COO—(CH₂)₆—O—CO—NH—CH₂—O—CH₃
     |
     CH₃

CH₂=CH—COO—⟨H⟩—O—CO—NH—CH₂—O—CH₃

CH₂=CH—COO—CH₂—⟨H⟩—CH₂—O—CO—NH—CH₂—O—CH₃
     |
     CH₃

CH₂=C—⟨NH—CH₂—O—CO—NH—CH₂—O—CH₃ / N⟩

CH₃
            |
CH₂=CH—⟨C₆H₄⟩—CH₂—O—CH₂CH₂—N—CO—NH—CH₂—O—CH₃

CH₂=CH—COO—CH₂—⟨H⟩—NH—CO—NH—CH₂—O—CH₃

CH₂=C—COO—CH₂CH₂—N—CO—NH—CH₂—O—CH₃
     |            |
     Cl           C₄H₉

CH₂=C—COO—CH₂CH₂—N⟨CH₂CH₂—O—CO—NH—CH₂—O—CH₃ / CH₂CH₂—O—CO—NH—CH₂—O—CH₃⟩
     |
     CH₃

CH₂=CH—COO—(CH₂)₆—N—CO—NH—CH₂—O—C₄H₉
                  |
                  C₂H₅

CH₂=C—COO—⟨C₆H₄⟩—N⟨CH₂CH₂—O—CO—NH—CH₂—O—CH₃ / CH₂CH₂—O—CO—NH—CH₂—O—CH₃⟩
     |
     CH₃

CH₂=C—COO—CH₂—CH₂—NH—CO—N⟨CH₂CH₂—O—CO—NH—CH₂—O—CH₃ / CH₂CH₂—O—CO—NH—CH₂—O—CH₃⟩
     |
     CH₃

CH₂=C—CO—NH—CH₂CH₂—O—CO—NH—CH₂—O—CH₃
     |
     CH₃

CH₂=CH—CO—N⟨CH₂CH₂—O—CO—NH—CH₂—O—CH₃ / CH₂CH₂—O—CO—NH—CH₂—O—CH₃⟩

CH₂=C—CO—N—CH₂—CH—O—CO—NH—CH₂—O—CH₃
     |    |     |
     (phenyl) C₂H₅ CH₃

CH₂=C—CO—NH—⟨C₆H₄⟩—O—CO—NH—CH₂—O—CH₃
     |
     CH₃

CH₂=CH—CH₂—N⟨CH₂CH₂—O—CO—NH—CH₂—O—CH₃ / CH₂CH₂—O—CO—NH—CH₂—O—CH₃⟩

CH₂=C—CO—NH—(CH₂)₄—O—CO—NH—CH₂—O—CH₃
     |
     C₂H₅

CH₂=C—COO—CH⟨CH₂—O—CO—NH—CH₂—O—CH₃ / CH₂—O—CO—NH—CH₂—O—CH₃⟩
     |
     CH₃

CH₂=CH—COO—⟨H⟩—O—CO—NH—CH₂—O—CH₃

CH₂=CH—COO—⟨H⟩—O—C(=O)—NH—CH₂—O—CH₃

CH₂=CH—O—CH₂CH₂—O—CO—NH—CH₂—O—CH₃

CH₂=CH—O—CH₂CH₂—O—CH₂CH₂—O—CO—NH—CH₂—O—CH

CH₂=C—O—CH₂—CH—O—CO—NH—CH₂—O—CH₃
     |        |
     CH₃      CH₃

CH₂=CH—⟨C₆H₄⟩—CH₂CH₂—O—CH₂CH₂—O—CO—NH—CH₂—O₃—CH₃

CH₂—CH—⟨C₆H₄⟩—CH₂CH₂—O—CO—NH—CH₂—O—CH₂

CH₂=CH—CH₂—O—CO—NH—CH₂—O—CH₃

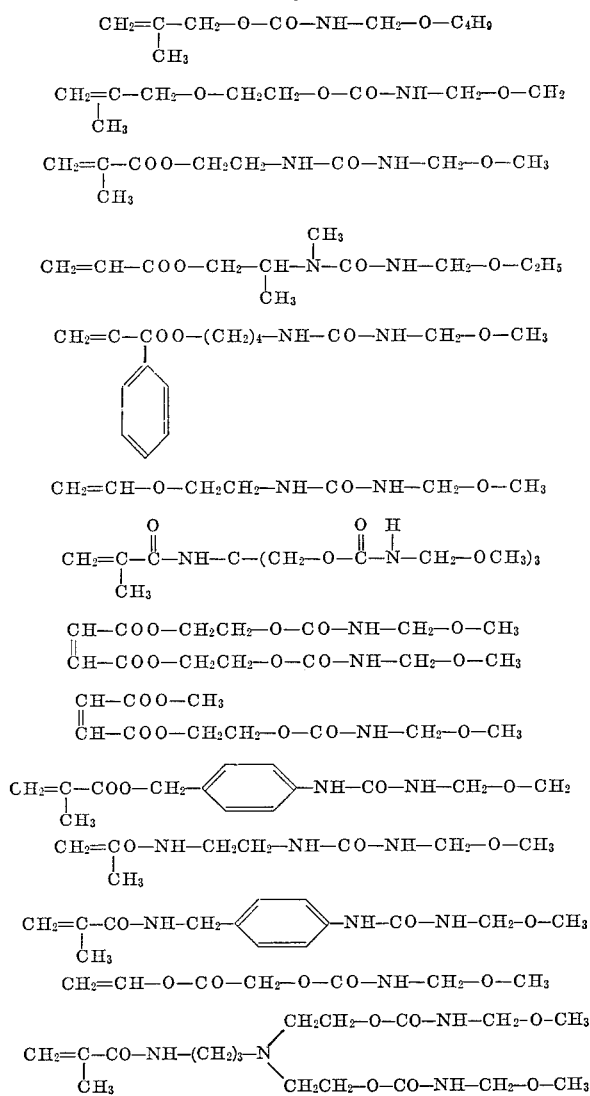

For the copolymerization with the monomers to be used according to the invention there may be used vinyl compounds such as styrene, styrene derivatives, such as chloro styrene, α-methyl styrene, p-isopropyl styrene, p-isopropyl-α-methylstyrene, vinyl chloride, acrylonitrile, methacrylonitrile, vinyl esters, having 1 to 6 carbon atoms in the ester group, vinylidene compounds such as vinylidene chloride and derivatives of acrylic acid or of methacrylic acid such as the monoesters with mono- or dihydric saturated aliphatic alcohols having 1–18 carbon atoms, preferably 1 to 6 carbon atoms. The following compounds are also suitable.

Diolefines such as butadiene and chlorobutadiene, isoprene, olefinically unsaturated compounds such as maleic acid, fumaric acid, or their anhydrides, their esters with 1 to 18 carbon atoms in the ester group, semi-esters with 1 to 18 carbons atoms in the ester group, amides and ester amides.

The polymerisation of the compounds to be used according to the invention either as such or in mixtures with other monomers may be carried out by the customary methods in bulk, solution, suspension or emulsion. For suspension polymerisation, the known dispersing agents may be used. Emulsifiers which may be used for emulsion polymerisation are the usual emulsifiers, e.g. anionic, cationic or neutral emulsifiers such as polyalkylene oxides, alkali metal salts of long chained alkyl sulphonates or quaternary ammonium salts containing hydrophobic radicals.

Polymerisation catalysts which may be used are compounds which are capable of forming radicals which have the effect of starting the polymerisation. These include, e.g., peroxidic compounds such as hydrogen peroxide, persulphates, alkyl- or aryl peroxides, hydroperoxides, diacylperoxides, and azo compounds such as bis-azoisobutyronitrile as well as Redox systems. For initiating ionic copolymerisations, one may use the usual initiators such as alcoholates or organometallic compounds or systems such as boron trifluoride etherate or perchloric acid.

The products obtained by the process described are valuable synthetic resins and elastomers which are suitable for a very wide variety of purposes in the technology of synthetic resins.

EXAMPLE 1A

Preparation of starting material 144 g. of 2-hydroxypropyl methacrylate are dissolved in 500 ml. benzene. 87 g. N-methoxymethylisocyanate are added dropwise to the solution at 40° C. A slightly exothermic reaction takes place. The clear, colourless reaction solution is then heated to boiling for one hour and subsequently concentrated by evaporation in vacuo. In the residue there remain 225 g. propanediol-2-N-methoxymethylurethane-1-methacrylic acid ester in the form of a colourless clear oil. $n_D^{20}$:1.4570.

EXAMPLE 1B

Homopolymerisation

A solution of 20 parts by weight of propanediol-2-N-methoxymethylurethane-1-methacrylic acid ester, hereinafter termed MMMU, in 100 parts by weight of glycol acetate is treated with 0.4 part by weight of benzoylperoxide and heated under $N_2$ for 18 hours at 90° C. During this operation, a clear, colourless, viscous solution forms which contains 95 to 100% of polymer.

When dried at room temperature or at elevated temperatures, the solutions of the polymer yield colourless, clear films which dissolve to form clear solutions in organic solvents.

When solutions of the polymer are treated with catalytic quantities of strong acids, cross-linked, insoluble polymers are obtained.

EXAMPLE 2

Copolymerisation in solution 300 parts by weight of styrene and 10 parts by weight of MMMU are polymerised in 100 parts by weight of benzene at 70° in a polymerisation vessel equipped with stirrer, with the use of 0.5 part by weight of azodiisobutylronitrile as polymerisation initiator.

The reaction is broken off after several hours and the copolymer precipitated by the addition of petroleum ether.

The copolymer was purified by repeated precipitation and 100 parts by weight of a white powder are obtained which separates even in the cold from solution in benzene as a cross-linked insoluble product after the addition of traces of toluenesulphonic acid or HCl.

EXAMPLE 3

Emulsions copolymerisation with ethyl acrylate

A mixture of 10 parts by weight of MMMU and 90 parts by weight of ethyl acrylate are added dropwise at 50° C. over about 2 hours to a solution of 0.2 g. potassium persulphate and 4 g. of a long-chained alkyl sulphonate in 400 ml. water while nitrogen is passed through and the reaction mixture vigorously stirred.

After 24 hours, a colourless emulsion is obtained which on drying yields clear films soluble in organic solvents such as DMF. The polymers can be cross-linked by the addition of acids.

EXAMPLE 4

Copolymerisation with butadiene

In an autoclave equipped with stirrer, which has been evacuated several times and filled with nitrogen, 45.0 parts of a fatty alkyl sulphonate, 1.0 part of tertiary sodium phosphate and 0.2 part of iron-(II)-sulphate are dissolved in 1800 parts of water which is free from oxygen, and treated with 950 parts of butadiene and 500 parts of MMMU and with 5.0 parts of tertiary dodecylmercaptan. While the reaction mixture is stirred intensively, it is heated to 30° C. after the addition of 14.0 parts by volume of 20% hydrogen peroxide. After a reaction time of about 12 hours, a stable dispersion having a solids content of 21.6% is obtained, which corresponds to a 60% conversion. Polymerisation is stopped by the addition of 1.0 part of hydroquinone, and after the addition of 7.2 parts of phenyl-β-naphthylamine, excess butadiene is removed by blowing out with nitrogen. The polymer contains 8.3% MMMU.

EXAMPLE 5

(a) Preparation of starting material 35 g. methacrylic acid trimethylol methylamide are suspended in 100 ml. benzene. 1 ml. triethylamine, 8 mg. phenothiazine and lastly 52.5 g. methoxymethylisocyanate are then added at 30 to 40° C. an exothermic reaction taking place and a clear solution being finally formed from the suspension. As the reaction progresses two layers are formed. The mixture is stirred for 30 minutes at 50° C., the phases are separated and the oil phase is dried in vacuo at a bath temperature of 80° C. As reaction product there are obtained 87 g. (100%) of the compound

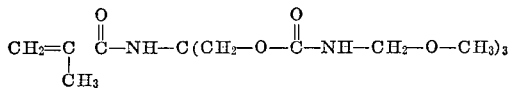

in the form of a yellow viscous oil.

(b) Copolymerisation with vinyl acetate

| | Parts |
|---|---|
| Vinyl acetate | 100 |
| Methyl ethyl ketone | 81 |
| Water | 25 |
| The compound prepared according to (a) | 10 |
| Sodium carbonate | 0.17 |
| 30% H$_2$O$_2$ in 80 parts of water | 0.22 | are kept at boiling temperature in an atmosphere of inert gas in a polymerisation vessel.

During this time, the hydrogen peroxide solution is added at a uniform rate to the polymerisation mixture. 100 parts by weight of water are then added and the methyl ethyl ketone distilled off.

76 parts by weight of a colourless copolymer are obtained which can be cross-linked by the action of acids, e.g., by treating a coplymer solution in ethyl acetate with toluene sulphonic acid.

EXAMPLE 6

(a) Preparation of starting material 122 g. ethanolamine are dissolved in 600 ml. ethanol. 174 g. methoxymethylisocyanate are added dropwise to this solution over 2 hours at 0 to 10° C. with cooling. The resulting clear solution is then stirred for a further one hour at 50° and then concentrated by evaporation in vacuo. 304 g. of N-β-hydroxyethyl-N'-methoxymethylurea remain behind in the residue in the form of colourless crystals of M.P. 54° C.

29.6 g. of this urea are dissolved in 100 ml. acetone together with 25 g. triethylamine and 6 mg. phenothiazine. 21 g. methacrylic acid chloride are added dropwise to this solution at 0 to 10° C. with cooling. The suspension obtained is stirred for 30 minutes at 40 to 50° C. The amine hydrochloride is then separated by suction filtration and the filtrate concentrated by evaporation in vacuo. In the residue there remain 35 g. of the compound

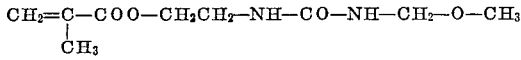

in the form of a yellow oil ($n_D^{20}$=1.484°).

(b) Copolymerisation with vinyl acetate 50 parts of vinyl acetate and 5 parts of the compound according to (a) are dissolved in 100 parts by weight of tertiary butanol in a polymerisation vessel. The reaction mixture is heated to 70° C., 0.15 part of azo diisobutyronitrile are added and the temperature maintained at 70° C. for 4 hours. The same quantity of azo compound is then again added and the temperature kept for a further 4 hours at 70° C. After cooling, the polymer is precipitated by the addition of water and dried at room temperature. 30 parts of a pure white copolymer is obtained which is soluble in ethyl acetate and separates from the ethyl acetate solution as a cross-linked product on the addition of a small quantity of toluene sulphonic acid.

The parts given in the examples are parts by weight.

EXAMPLE 7

(a) Preparation of starting material 15.5 g. of methoxy methyl isocyanate are added to a mixture of 11.6 g. of allyl alcohol and 0.1 g. of tin dioctoate (activator) at 50–60° C. with stirring. After the exothermic reaction has subsided the mixture is heated to 80° C. for 4 hours. The reaction product is a light yellow coloured oil and is distilled in vacuo.

Yield: 19 g. of N-methoxy methyl allylurethane colourless liquid; $n_D^{20}$=1.4474, B.P.=55° C. at 0.05 mm./Hg.

(b) Process according to the invention

A mixture of 40 g. of N-methoxy methyl allylurethane, 60 g. of methacrylic acid-β-hydroxy propyl ester, 30 g. of styrene, 70 g. of acrylic acid butyl ester and 1 g. azoisobutyronitrile is added dropwise to a mixture of 150 g. of xylene and 150 g. of butanol within 2 hours at 90° C. with stirring and passing nitrogen therethrough. After stirring for about 20 hours at 90° C. a colourless clear viscous solution with a solids content of 35–40% is obtained. After adding catalytical amounts of strong acids, e.g. phosphoric acid, tartaric acid, p-toluolsulfonic acid, applying the mixture onto suitable supports, e.g. sheet metal, and hardening at temperatures of 80–150° C., highly lustrous hard and elastic films which are resistant to solvents, are obtained.

EXAMPLE 8

(a) Preparation of starting material 252 g. of methoxy methyl isocyanate are added dropwise at 40–50° C. to a solution of 242 g. of methacrylic acid-N-(di-β-hydroxyethyl)-amide and 0.5 g. of tin dioctoate in 500 ml. of acetonitrile. An exothermic reaction occurs which lasts about 2–5 hours. The reaction product is then stored at room temperature for 2 days. Upon the addition of 0.05 g. of phenothiazine as stabiliser the resulting colourless acetonitrile solution is evaporated in a rotary evaporator at a bath temperature of 60° C. In the residue there remain 486 g. of the compound

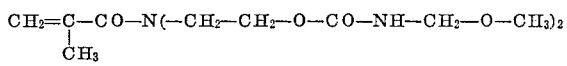

in form of a colourless oil.

(b) Process according to the invention

By polymerising as described in Example 7(b) a mixture of 20 g. of the compound prepared according to Example 8(a), 30 g. of methacrylic acid-β-hydroxypropyl ester and 50 g. of acrylic acid butyl ester at 90° C. in 150 g. of a mixture of equal parts of xylene and butanol a highly viscous clear solution with a solids content of 40% is obtained after 24 hours. After the addition of catalytical quantities of acids, applying the mixture onto suitable supports, e.g. sheet metal, and hardening at 80–150° C., highly lustrous, elastic and solvent-resistant coatings are obtained.

EXAMPLE 9

(a) Preparation of starting material 102 g. of methoxy methyl isocyanate are added at 40–50° C. with vigorously stirring and weakly cooling with water to a solution of 150 g. of methacrylic acid-β-hydroxy-ethylamide and 0.1 g. of tin dioctoate in 300 ml. of dioxane. After the addition of the isocyanate the solution is left standing overnight. The resulting crystal paste is cooled to +10° C. and then filtered. The crystals are washed with little cold dioxane and dried at 50° C. in vacuo. 182 g. of the compound

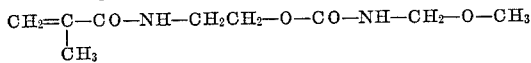

are obtained in form of colourless crystals and a melting point of 91–92° C.

(b) Process according to the invention

A solution of 20 g. of the monomer prepared according to Example 9(a), 80 g. of acrylic acid ethyl ester and 1 g. azoisobutyronitrile in 150 ml. of tert, butyl alcohol is stirred under nitrogen at 80–90° C. for 24 hours. The resulting colourless highly viscous solution is substantially free from monomer and, by applying same onto suitable supports such as glass, metal or wood, and subsequently heating in the presence of catalytical amounts of strong acids, e.g. phosphoric acid or maleic acid, at temperatures of 80–150° C. yields hard elastic films which are resistant to solvents.

EXAMPLE 10

(a) Preparation of starting material

To 280 g. of acrylic acid-β-hydroxy propyl ester there are added at 40–50° C. with good stirring 0.4 g. of tin dioctoate and then slowly within 2 hours, 187 g. of methoxy methyl isocyanate. The reaction occurring between the two components proceeds exothermally; therefore, the aforesaid temperature range is maintained by cooling with water. After the reaction has subsided the mixture is stirred at room temperature for another 5 hours. The resulting product of the formula

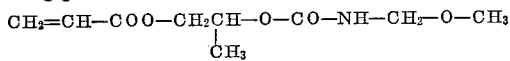

is a colourless oil of a viscosity of 43 cp. at 25° C. $n_D^{20}=1.4568$.

(b) Process according to the invention 300 g. of a mixture of equal parts of xylene and butanol are reacted with a mixture of 40 g. of the compound prepared according to Example 10(a), 30 g. of styrene, 70 g. of acrylic acid butyl ester, 60 g. of methacrylic acid-β-hydroxy propyl ester and 1 g. of azoisobutyronitrile at 90° C. within 3 hours while stirring and passing nitrogen therethrough. After stirring at 90° C. for 24 hours a clear viscous monomer-free solution with a solids content of 40% is obtained. This solution yields cross-linked elastic films of high gloss and outstanding resistance to solvents in the manner described in Examples 7–9.

We claim:

1. A compound of the formula:

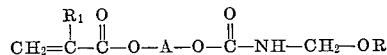

wherein $R_1$ is selected from the group consisting of hydrogen and methyl, A is selected from the group consisting of

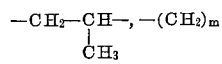

where $m$ is an integer from 1 to 6 and

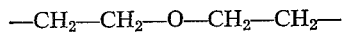

and R is a member selected from the group consisting of methyl, ethyl, butyl, cyclohexyl and α-allyl.

2. A film-forming homopolymer of the monomer of claim 1.

3. A film-forming copolymer of the monomer of claim 1 and at least one monomer selected from the group consisting of styrene, chlorostyrene, α-methyl-styrene, p-isopropyl styrene, p-isopropyl-α-methyl styrene, vinyl chloride, vinylidene chloride, acrylonitrile, methacrylonitrile, esters of acrylic acid and methacrylic acid with alkanols having from 1 up to 18 carbon atoms, butadiene, isoprene and chlorobutadiene.

References Cited

UNITED STATES PATENTS

| | | | |
|---|---|---|---|
| 2,806,838 | 9/1957 | Melamed | 260—77.5 |
| 2,810,713 | 10/1957 | Melamed | 260—80.3 |
| 2,832,755 | 4/1958 | Melamed | 260—77.5 |
| 2,832,756 | 4/1958 | Melamed | 260—77.5 |
| 2,837,499 | 6/1958 | Melamed | 260—77.5 |
| 2,978,432 | 4/1961 | Graulich et al. | 260—45 |

JOSEPH L. SCHOFER, Primary Examiner

J. C. HAIGHT, Assistant Examiner

U.S. Cl. X.R.

260—80.72, 80.73, 80.81, 83.5, 85.5, 85.7, 86.1, 87.1, 87.5, 8.1, 89.1, 89.3, 89.5, 89.7, 309.6, 477, 482, 486 553, 586